Dec. 14, 1926.
J. DUBROVIN
1,610,761
LUBRICATING DEVICE FOR CRANK ACTUATED MECHANISMS
Original Filed August 15, 1925
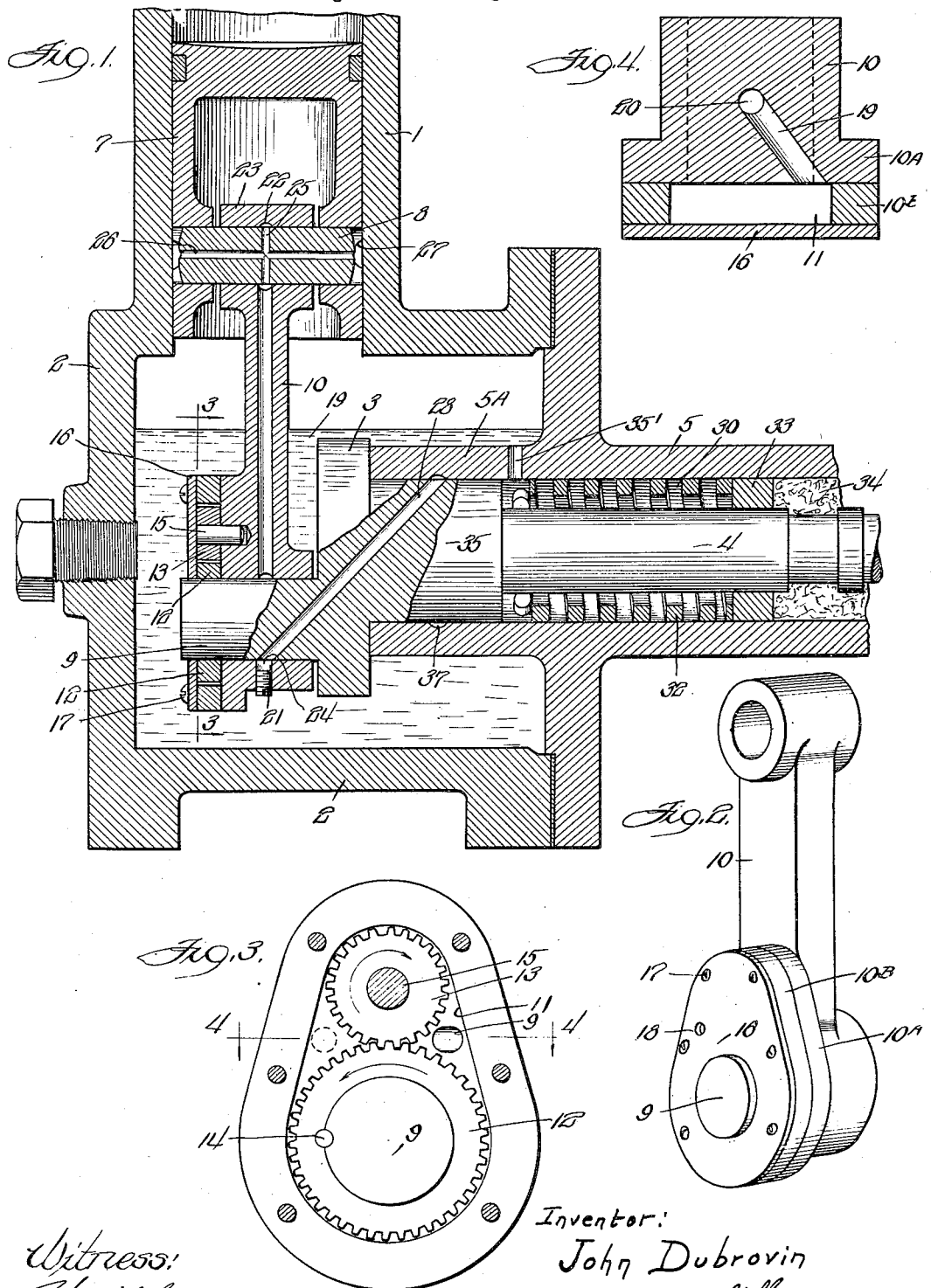
Inventor:
John Dubrovin
by Albert Scheible Attorney Patented Dec. 14, 1926.

1,610,761

UNITED STATES PATENT OFFICE.

JOHN DUBROVIN, OF LOGANSPORT, INDIANA, ASSIGNOR, BY MESNE ASSIGNMENTS, TO UNIVERSE CORPORATION.

LUBRICATING DEVICE FOR CRANK-ACTUATED MECHANISMS.

Application filed August 15, 1925, Serial No. 50,371. Renewed October 18, 1926.

My invention relates to means for lubricating parts of a crank operated mechanism in which the crank end of the connecting rod dips into a body of oil, and more particularly to the lubrication of parts of a mechanism in which a piston is connected by a connecting rod to a crank. Generally speaking, it is the object of my invention to provide a pressure feed of oil for parts associated with or adjacent to the crank pin (such as the usual crank pin, crank bearing, wrist pin and the piston) and to effect the feeding of the oil by means of a pump mounted on the connecting rod and driven by the crank.

More particularly, my invention provides a lubricating system of the class described in which the housing for the oil pump is carried by the connecting rod and has an inlet open to the crank casing, in which the pumping of the oil is effected by intermeshed vanes or gears disposed within this casing and having one of the gears driven by the crank pin, and in which the distribution of the forced oil is effected through passages extending through the connecting rod and parts adjacent thereto. Furthermore, my invention provides a simple, easily manufactured and inexpensive construction for such purposes and also provides means for preventing an excessive oil pressure in the crank shaft housing. Still further and also more detailed objects will appear from the following specification and from the accompanying drawings, in which—

Fig. 1 is a fragmentary vertical section through a compressor embodying my invention, taken centrally and longitudinally of the crank shaft of the compressor.

Fig. 2 is a perspective view of the connecting rod and the pump carried by it.

Fig. 3 is a front view of the lower portion of the connecting rod with the cover of the pump casing detached.

Fig. 4 is a section taken transversely of the connecting rod along the line 4—4 of Fig. 3.

In one of its immediate commercial applications, my invention is particularly suitable for oiling certain portions of compressors as employed for compressing refrigerants. Hence I am illustrating and describing my invention in such an embodiment, although I do not wish to be limited to any particular application of the same.

In the drawings, Fig. 1 shows portions of a compressor in which the housing includes a cylinder 1 formed integral with a portion of a crank casing 2 which houses a crank 3 fastened to a crank shaft 4. The crank abuts against the inner or bearing end 5ᴬ end of a crank shaft housing, and the inner end of this housing affords a bearing for a boss 35 on the crank.

A hollow piston 7 slidably fitting the bore of the cylinder 1 has a wrist pin 8 extending across it and tightly fitted in corresponding bores in opposite sides of the piston, this wrist pin being connected to the crank pin 9 of the crank by a connecting rod 11 in the usual manner.

The lower forward portion of the connecting rod carries a pump housing including a chamber 11 which houses a gear 12 and a pinion 13 intermeshing with the gear. The gear 12 is sleeved upon the crank pin 9 and is interlocked with the latter by a drive pin 14 which prevents the gear from rotating on the crank pin, while the pinion 13 is journaled on a pin 15 which is driven into the connecting rod as shown in Fig. 1. Both the gear and the pinion are held within the said chamber by a face plate 16 which fits snugly over the crank pin and which is held tightly in place by screws 17. This face plate has an aperture 18 leading to the space between the gear and the pinion, so as to afford an inlet for the oil 19 which is maintained within the crank casing 2 and which is here shown as reaching above the top of the crank bearing. The end of the chamber 11 adjacent to the pinion is bored out concentric with the axis of the pinion so that the teeth of the latter will barely clear it, and the opposite ends of the said chamber is similarly bored out concentric with the axis of the crank pin so that it will be barely cleared by the teeth of the gear 12.

The chamber 18 is connected by a bore 19 (Fig. 4) to a bore 20 which extends longitudinally within the connecting rod from the crank pin 9 to the wrist pin 8, this bore being readily made by drilling into the connecting rod from the lower end thereof and then closing the extreme lower end of the resulting bore by a plug 21. The bore as thus formed leads to a groove 22 in the wrist pin bearing 23 at the upper end of the connecting rod, and also to a corresponding annular groove 24 in the crank pin bearing of this rod. The wrist pin also desirably has a transverse bore 25 in alinement with the groove 22, and a longitudinal bore 26 intersecting the bore 22 and opening at each end into an annular groove 27 turned in the exterior of the piston. The crank bearing 5 also desirably has an annular groove 37 formed in it opposite the middle of the length of the bearing collar 5^A, and this groove 27 is operatively connected to the groove 24 in the connecting rod by a bore 28 extending diagonally through the crank pin 9 and the said collar or boss 35 on the crank.

With the parts thus arranged and with the crank rotating in a direction which is counterclockwise in Fig. 3, the gear 12 rotates with the crank pin with respect to the adjacent end of the connecting rod, thereby rotating the pinion in a direction which is clockwise in Fig. 3. Consequently, oil will be carried between adjacent teeth on the pinion and also between adjacent teeth on the gear from the left-hand or inlet side of the chamber 11 in Fig. 3 to the right hand side, so as to be forced out of this chamber through the outlet bore 19.

From this bore it will be distributed through the groove 24 over the crank pin and from this groove through the bore 28 to the groove 37 in the crank bearing so as to oil the latter. By locating the groove 37 substantially opposite the middle of the length of the boss 35 on the crank shaft, I cause the oil to distribute both forwardly and rearwardly along that enlargement, so that a forwardly moving portion of the oil will lubricate the end of the crank bearing 5^A against which the crank bears. The excessive oil in the rearwardly moving portion will pass into the space 30 between the crank shaft 4 and the crank shaft casing 31, which space is here shown as housing a spring 32 for forcing a slidable collar 33 to compress loose packing 34, after the manner disclosed in my copending application No. 729,666 on a stuffing box. To avoid an undue pressure of oil in this space, I preferably provide a port 35 leading from the same into the crank casing, thereby automatically relieving such pressure.

The pressure of the oil forced into the longitudinal bore 20 of the connecting rod also forces oil into the groove 22 in the upper bearing portion of this rod, thereby oiling the bearing of this rod on the wrist pin, and oil from this groove will pass through the bores 25 and 26 to the space between the ends of the wrist pin and into the groove 27 on the piston, so as to oil the piston and cylinder effectively.

By suitably proportioning the diameters and the sizes of the teeth on the intermeshed pump members 12 and 13 with respect to the rate of rotation of the crank shaft, and with respect to the viscosity of the oil, I can readily secure a desirable pressure upon the oil. Hence my simple and compact construction will enable me to provide a positive and continuous lubrication of important parts to which oil cannot readily be supplied from outside the casing without admitting air and possibly moisture from outside the compressor. Moreover, by feeding the oil under pressure, I cause it to carry any impurities with it through the various bores and grooves, so as to avoid having impurities in the oil interfere with the needed lubrication.

To facilitate the machining of the bottom of the pump chamber 11, I preferably make the pump housing of three parts, only one of which (namely the part 10^A of Fig. 2) is integral with the connecting rod. Then I provide an intermediate portion 10^B which can readily be faced off on both ends to fit the previously faced front of the part 10^A and the faceplate 16. By making the thickness of the intermediate part 10^B only minutely larger than the uniform thickness of the gear 12 and the pinion 13, I effectively prevent oil from passing across the faces of the gear and pinion and hence can secure a highly efficient pump, while still leaving the gear and pinion in what is effectively a chamber in the connecting rod.

In addition to affording a positive lubrication for certain parts, my simple pump and oil passage arrangements also enables me to maintain films of oil under pressure in the various spaces into which the oil is forced, thereby causing the oiled bearing parts to ride on films of oil when they become worn or in case they have not been accurately machined. Hence I avoid the pounding noises which would otherwise be due to the resulting lost motion. Moreover, the film of oil thus maintained under pressure between the piston and the cylinder prevents gas from leaking past the piston into the crank casing, thereby affording a better seal and effectively increasing the volumetric capacity of the compressor.

However, while I have illustrated and described my invention in a highly desirable embodiment, I do not wish to be limited to the details of the construction and arrangement thus disclosed, it being obvious that the same might be modified in many ways without departing either from the spirit of my invention or from the appended claims.

I claim as my invention:—

1. The combination with a connecting rod and a crank having its crank pin journaled in one end of the connecting rod, of a pumping device carried by the connecting rod and actuated by the rotation of the crank pin with respect to the connecting rod; the pumping device including a toothed member rotatably mounted on the connecting rod and a second toothed member fast on the crank pin and intermeshing with the aforesaid member.

2. The combination with a connecting rod and a crank having its crank pin journaled in one end of the connecting rod, of a pumping device carried by the connecting rod and actuated by the rotation of the crank pin with respect to the connecting rod, and a bearing for the crank, the connecting rod and the crank having connecting passages through which lubricant can be forced by the pumping device.

3. The combination with a crank and a connecting rod associated therewith, of a pump casing carried by the connecting rod, a rotatable pumping member in the casing, and a driving connection between the said member and the crank pin of the crank, the connecting rod having passages therein leading from the pump casing to a bearing of the connecting rod.

4. The combination with a crank and a connecting rod associated therewith, of a pump casing carried by the connecting rod and into which casing the crank pin of the crank extends, and a rotatable pumping member disposed in the casing and fast on the crank pin, the connecting rod having a passage therein leading from the pump casing to a bearing of the connecting rod.

5. The combination with a crank, of a connecting rod provided with a chamber and with a passage leading from the chamber to one of the bearings of the connecting rod, and also provided with an inlet port for the said chamber, and a pumping member fast upon the crank pin of the crank, the pumping member being rotatable within the said chamber and arranged for pumping fluid from the said inlet port to the said passage.

6. The combination with a crank casing and with oil in the said casing, of a crank dipping into the oil, a connecting rod journaled upon the crank pin of the crank, the connecting rod having a passage therein leading to its crank pin bearing, and an oil pumping mechanism carried by the connecting rod and actuated by the rotation of the crank pin with respect to the connecting rod for forcing some of the said oil through the said passage.

7. The combination with a crank casing and with oil in the said casing, of a crank journaled in the casing and dipping into the oil, a connecting rod journaled at one end on the crank pin of the crank, the connecting rod having a chamber therein provided with an inlet for the admission of oil and also having a passage leading from another part of the chamber to its crank pin bearing, and mechanism disposed in the said chamber and actuated by the rotation of the crank pin with respect to the said crank pin bearing for pumping oil through the said inlet and forcing it through the said passage.

8. The combination with a crank, a piston provided with a wrist pin, and a connecting rod journaled at its ends respectively on the wrist pin and on the crank pin of the crank, of a crank casing containing oil into which the crank end of the connecting rod dips, and an oil pump carried by the connecting rod and operated by the rotational movement of the crank pin and having an inlet open to the said oil, the connecting rod, wrist pin and piston having connecting passages leading from the pump to the bearing surface of the piston.

Signed at Chicago, Illinois, August 7th, 1925.

JOHN DUBROVIN.